United States Patent [19]

Bocca et al.

[11] 3,883,404

[45] May 13, 1975

[54] METHOD FOR MAKING SULFUR DIOXIDE-TREATED ASPHALT BINDERS

[75] Inventors: Pier Luigi Bocca; Pierpaolo Pacor, both of Rome, Italy

[73] Assignee: Exxon Research and Engineering Company, Linden, N.J.

[22] Filed: Oct. 23, 1973

[21] Appl. No.: 408,833

[30] Foreign Application Priority Data
Oct. 23, 1972 Italy................................. 53550/72

[52] U.S. Cl..................................... 208/44; 208/3
[51] Int. Cl............................................... C10c 3/02
[58] Field of Search................................ 208/44, 3

[56] References Cited
UNITED STATES PATENTS
2,093,450 9/1937 Jacobsohn ............................ 208/44
3,006,846 10/1961 Stratton ................................ 208/44

FOREIGN PATENTS OR APPLICATIONS
483,907 4/1938 United Kingdom................... 208/44

Primary Examiner—Veronica O'Keefe
Attorney, Agent, or Firm—Byron O. Dimmick

[57] ABSTRACT

Asphalt-like binding and coating agents are made by reacting $SO_2$ or a gas containing $SO_2$ with liquid phase hydrocarbon materials at elevated temperatures, optionally in the presence of a catalyst, until an asphalt-like material of desired physical and/or rheological properties is produced. The preferred hydrocarbon materials are selected from aromatic extracts, precipitated asphalts, catalytic cycle oils, heavy vacuum side streams, atmospheric bottoms, asphalts and mixtures of the foregoing. The $SO_2$ may be derived from $H_2S$ refinery streams. Preferred catalysts are transition metals salts, treating temperatures are preferably 200°–370°C for preferred periods of 3–20 hours.

8 Claims, 5 Drawing Figures

METHOD FOR MAKING SULFUR DIOXIDE-TREATED ASPHALT BINDERS

The present invention relates to novel binders and coating agents and processes for making them.

There is an increasing demand for bitumen-like products of improved elasticity, ductility and improved properties in relation to low temperatures and solvents suitable for use as materials for road surfacing and paving, for bonding and coating a variety of materials and for use as a sealing and roofing material.

Materials for the foregoing purposes which are known and employed at present comprise asphalts of various types which, due to some inadequacy or absence of one of the desirable properties required, are available in insufficient supply to meet market demands or to be completely satisfactory for the applications in which it is intended to use them.

In order to improve the technical properties of asphalts, it has been proposed to oxidize asphalts with air, to treat bitumens with sulphur and to treat asphalts, bitumens and their derivatives with sulphuric acid. It has also been proposed to employ mixtures of asphalts and polymeric resins, and although such mixtures provide products of good quality, their cost tends to be excessively high.

It has been suggested in British patent specification No. 493905 to react a bitumen or asphalt feed material with sulphuric acid at a high temperature, preferably 180° to 360°C, and under sufficient pressure (about 10 to 30 atmospheres) in order to prevent the escape of sulphur dioxide from the reactants whereby an oxidizing and sulphurizing effect takes place. This reaction is said to proceed through the decomposition of the sulphuric acid according to the reaction:

$$H_2SO_4 \rightarrow H_2O + SO_2 + o$$

This process is, however, exceedingly complex, and requires, among other things, processing under difficult conditions of high temperatures and pressures, in combination, and is found to be exceedingly costly and difficult to perform.

An object of the present invention is to produce binding and coating agents having superior characteristics to commercially available products employing cheap raw materials and relatively mild treating conditions and simple procedures.

According to the present invention, there is provided a process for the production of binding and coating agents which comprises contacting at elevated temperatures a hydrocarbon material in the liquid phase with a gas containing sulphur dioxide.

The preferred hydrocarbon materials are those of low value and which are generally regarded as refinery by-products. The hydrocarbon materials may have molecular weights in the range of from 300 to 10,000, preferably 600 to 1500, and may be selected from aromatic extracts obtained by solvent extraction, straight run asphalt, vacuum bottom asphalt, heavy side streams from vacuum distillation columns and pipe stills, catalytic cracker cycle oils, vacuum pipe still residues, precipitated asphalts obtained from mixtures of asphalts with other hydrocarbons, deasphalted aromatic hydrocarbons and blends and mixtures of at least two of the foregoing.

The most preferred hydrocarbon materials are those of low value which, by the process of this invention, can be cheaply converted to binders and the like of greater utility and value.

In particular, aromatic extracts obtained by the solvent extraction of lubricating oil distillate fractions, catalytic cycle oils and precipitated and other asphalts tend to be materials of low utility and low value available at oil refineries. The aromatic extracts are derived by solvent extraction with liquid $SO_2$, phenol, furfural or other well-known solvent having a greater selective affinity for aromatic hydrocarbons than for paraffinic hydrocarbons.

Among the aromatic extracts which may be employed are those having a viscosity at 210°F in the range of from 30 to 300 SSU, an initial boiling point in the range of from 350° to 670°F and an aromatic content of at least 55 wt.%, in the range of from 60–87 wt.% aromatics. The aromatic extract may be an extract from a single lube cut or it may be a blend of extracts from a plurality of lubricating oil cuts.

The hydrocarbon material may also comprise precipitated asphalt. This is asphalt which has been precipitated from a mixture of asphalt and other hydrocarbons as a result of adding to the mixture a solute or miscible agent which dissolves or mixes with the other hydrocarbons and reduces the solubility of asphalt in the asphalt/hydrocarbon mixture. Suitable solutes are short chain liquid or readily liquefiable paraffins, e.g. the straight chain $C_3$–$C_8$ paraffins. The commonest precipitating agent employed is propane. The precipitated asphalt (hereinafter termed PA) may have a penetration as determined by ASTM test D5-25 of from 1 to 35 mm/10, and a softening point, as determined by ASTM test D36 (Ring-and-ball method) in the range of from 55° to 85°C, preferably 60° to 75°C.

A preferred hydrocarbon material comprises a mixture of at least one aromatic extract and PA, most preferably in which the aromatic extract forms a major proportion of the mixture (e.g. more than 55%, preferably more than 65%.)

The hydrocarbon material may comprise an asphalt having a penetration of 65 to 220 mms/10 and a softening point (ring-and-ball) of from 35° to 55°C.

The elevated temperatures at which the $SO_2$-containing gas is contacted with the hydrocarbon material may be any convenient temperatures at which the hydrocarbon material reacts with $SO_2$, and may be in the range of from 180°C up to temperatures at which the liquid hydrocarbon thermally decompose, preferably not exceeding 650°C. For most purposes, the reaction process will proceed satisfactorily at temperatures in the range of from 200° to 370°C, preferably 240° to 320°C, more preferably at 280°–310°C. The most satisfactory reaction temperature will depend, among other things, on the nature of the hydrocarbon material and the composition of the $SO_2$-containing gas.

The $SO_2$ of the $SO_2$-containing gas may comprise from 5 to 100% of the gas. In the case where the $SO_2$ is less than 100%, the diluents may comprise nitrogen and oxygen. A convenient source of the $SO_2$-containing gas is hydrogen sulphide which is commonly available in petroleum refineries, usually as a waste material. Oxidation of the $H_2S$ with air gives $SO_2$, and theoretically, the maximum concentration of $SO_2$ would be about 14%. However, the theoretical concentration may not be achieved due to reaction between $SO_2$ and $H_2S$ and it may be desirable in some cases to provide an excess of air: the resulting $SO_2$-containing gas will then contain some unused oxygen, which might affect the characteristics of the binder product to some extent.

Preferably, the $SO_2$-containing gas is blown through the liquid phase hydrocarbon material. The feed rate of $SO_2$-containing gas may provide from 0.5 to 6.0 litres (at S.T.P.) of $SO_2$ per hour, preferably 1 to 3 litres per hour, per kilogram of liquid hydrocarbon material.

The time period over which the hydrocarbon material and $SO_2$-containing gas are contacted depends on the nature of the hydrocarbon material, the concentration and feed rate of $SO_2$ and the properties desired for the product of the reaction. The time period may be from as short as 2 or 3 hours up to 45 hours. From the economic viewpoint, shorter time periods are preferred. The reaction time may be reduced by mixing with the hydrocarbon material a catalyst which promotes the reaction with $SO_2$. The catalyst may be selected from organic salts of transition metals and from inorganic salts of Fe, Mn, Cr, Bi and Ni in their high valence states and from mixtures of the foregoing. A preferred catalyst is a metal (e.g. Mn) salt of commercially available naphthenic acids. It is preferred that the concentration of catalyst should be such that the metal or metals of the metal salt(s) constitutes no more than 1 wt.%, e.g. 0.1 to 1.0 wt.%, of the weight of hydrocarbon material.

The activity of the catalyst may be increased by irradiation with ultra violet radiation, preferably before, but possibly after, it is mixed with the hydrocarbon material. The ultra violet radiation may have wavelengths in the range of from 210 to 400 millimicrons, e.g. about 254 millimicrons.

The contacting of the $SO_2$-containing gas with the hydrocarbon material is preferably continued until the sulphur content of the hydrocarbon material is increased by up to 12 wt.%, the selected increase depending on the properties desired in the product. An increase of as little as 0.75 wt.% sulphur can produce binder products from blends of aromatic extract and propane PA (PPA) which are superior to commercial paving grade asphalt, at least so far as their low temperature brittleness (as determined by the Fraass point test (British Institute of Petroleum, test IP80)) for a given penetration.

The product which is recovered after the contact of the $SO_2$-containing gas and the hydrocarbon material may have virtually any desired combination of properties, e.g. a penetration of at least 7 mms/10, a softening temperature of at least 25°C and a ductility not exceeding 250 (as determined by IP test 32).

The chemical reactions which take place during the process of the invention are not fully understood, but it is thought that the reactive species of the hydrocarbon material are the saturates, naphthenoaromatics and polar-aromatics (according to the classification proposed by L. W. Corbett, Anal. Chem., 41,576 (1969)), and in the reaction product, these are modified to give (in varying degrees) asphaltenes and in some instances, heavy polar aromatics. The asphaltenes tend to have a high sulphur content (4 to 10%) the sulphur apparently being present as long polysulphide (—S—S—S—) chains which bridge the aromatic and/or aliphatic molecules. The polar aromatics in the product tend to be of higher molecular weight than the polar aromatics in the unreacted hyrocarbon material and have high sulphur contents (from 3 to 8%). The aromatisation of the hydrocarbon feed materials enhances the setting qualities of the reaction product, while the bonds produced by the sulphur improve the low temperature characteristics of the products — such improved characteristics manifest themselves as good ductility and good resistance to solvent action, (as determined by the weight loss of a sample immersed in gas oil for 9 days and in kerosene for 2 and 9 days).

The invention will now be described by way of non-limitative examples and illustration and with reference to the accompanying drawings in which.

Figure 1:
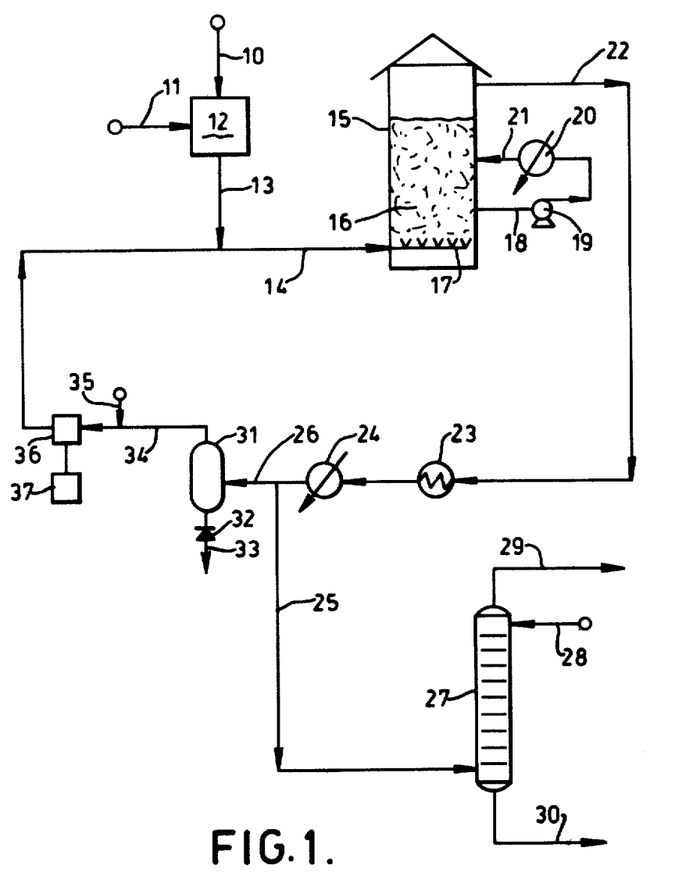
FIG. 1 is a schematic flow diagram of a plant for performing the invention.

Referring first to FIG. 1, the plant therein schematically depicted is for the batch conversion of hydrocarbon material to bitumen products by contact with a gas containing $SO_2$. It is to be appreciated that the process may also be performed continuously or semi-continuously in stages.

A hydrogen-sulphide-containing gas from a refinery or $H_2S$ scrubber is passed via line 10 to a suitable oxidizing zone 12 wherein it is mixed with an oxygen and-/or air stream from line 11 under such conditions that the $H_2S$ is converted to $SO_2$.

The $SO_2$-containing gas is introduced into line 14 and passes to a number of blowing nozzles of any suitable type located near the bottom of a reaction vessel 15 containing a batch 16 of liquid hydrocarbon material which is being treated by the process of the invention, and a catalyst to promote the reaction. Preferably the hydrocarbon material is a mixture comprising an aromatic extract obtained by the solvent extraction of a lubricating oil cut with a propane precipitated asphalt (PPA). The PPA preferably constitutes up to 50% of the mixture, mmore preferably 30–50%, depending on the hardness required of the product. Other hydrocarbon materials may be present in addition to or instead of the extract and the PPA, in particular, catalytic cracker cycle oils. Generally speaking, such oils have the following range of characteristics:

| | |
|---|---|
| Density at 15° | 0.98 to 1.10 g/cc |
| Viscosity at 98.9°C | 2 to 8 cSt |
| Aniline point | 25 to 80°C |
| Distillation range reduced to atmospheric pressure | 180 to 660°C |

The pressure in the vessel 15 is approximately atmospheric pressure, and the temperature therein, for most feedstocks is maintained at between 270° and 330°C.

The reaction between the hydrocarbon material and the $SO_2$-containing gas will usually not be substantially exo- or endo-thermic, but depending on the nature of the hydrocarbon material and the temperature and composition of the gas stream, there may be a nett tendency for the temperature of the batch 16 to change.

During operation, temperature regulation is achieved, when required, by removing material via line 18 employing pump 19, passing the thus removed material through a heat exchanger 20 and returning the material to the batch 16 via line 21. As depicted, the heat exchanger 20 is arranged for dissipating heat, but suitable arrangements can also be made to enable heat to be supplied to the material passing through the heat exchanger 20.

Unreacted gas and hydrocarbon and other vapours leave the top of vessel 15 via line 22, passes through a heat recovery device 23 and a condenser 24, whereafter the stream is split between two lines 25 and 26. The stream from line 26 passes to a knock-out drum 31 wherein condensed materials are accumulated, and intermittently discharged via valve 32 and line 33.

Uncondensed gas is recirculated to line 14 by circulating fan 36 driven by motor 37.

Since not all the gas entering at line 13 will be absorbed in batch 16 or condensed and retained in drum 31, the excess of gas in the system is vented via line 25 to a tower 27 down which an $SO_2$-absorbing liquid supplied from line 28, such as sodium hydroxide solution, is passing countercurrently to the upflowing gas. The gas effluent in line 29 is substantially free of $SO_2$, and the liquid containing the stripped-out $SO_2$ is removed from the tower via line 30.

At the beginning of each batch process cycle, the fresh hydrocarbon material may be brought up to the reaction temperature by any suitable heating arrangement known in the art. At the end of each batch process cycle, the product is pumped out in any suitable manner, and an inert purge gas (suitably nitrogen) is introduced via line 35 to remove condensible materials, and to prevent the formation of potentially explosive mixtures in the system.

The processing of each batch is continued until the chemical and physical properties required in the product are achieved. The processing time for each batch depends on the composition of the batch, the treating temperature, $SO_2$-gas feed rate, and whether or not catalysts are present. Processing times may be as short as 2 hours or as long as 50 hours, but for most applications, processing times will be from 4 to 24 hours.

Figure 2:
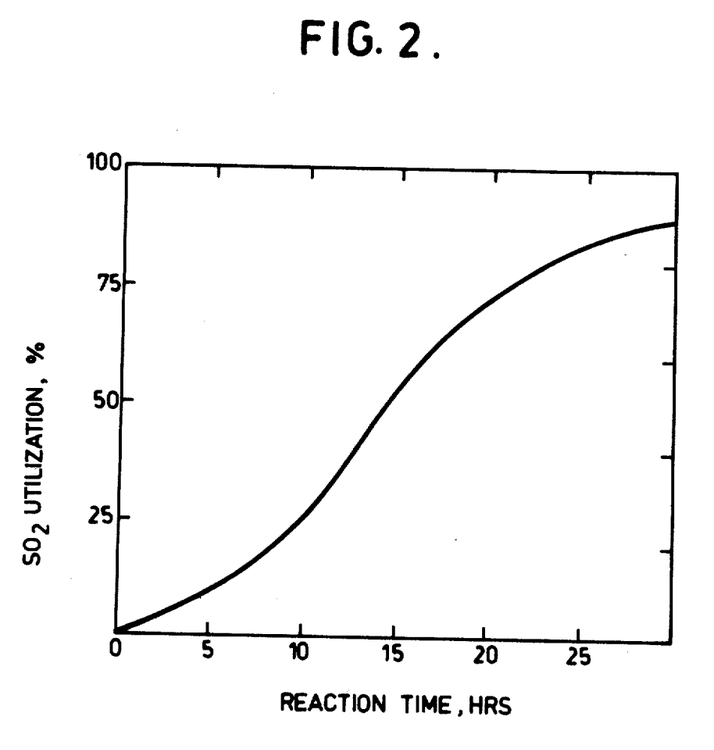
FIG. 2 is a graph of % $SO_2$ utilization (ordinate) versus time.

FIG. 2 is an examplary graph of the percentage utilization of $SO_2$ in the feed gas versus reaction time based on the results of the laboratory tests. It will be seen that the initial $SO_2$ utilization is low, but increases after 10–12 hours and reaches good values after 20 hours. Steeper curves than the foregoing can be obtained in commercial plant employing correctly designed equipment (e.g. good $SO_2$-blowing nozzles, cylindrical reaction vessel with baffles) and when a catalyst, particularly an ultra-violet irradiated catalyst is employed.

The properties of the products obtained can vary over a considerable range according to the type of feedstock selected and the treating conditions.

Figure 3:
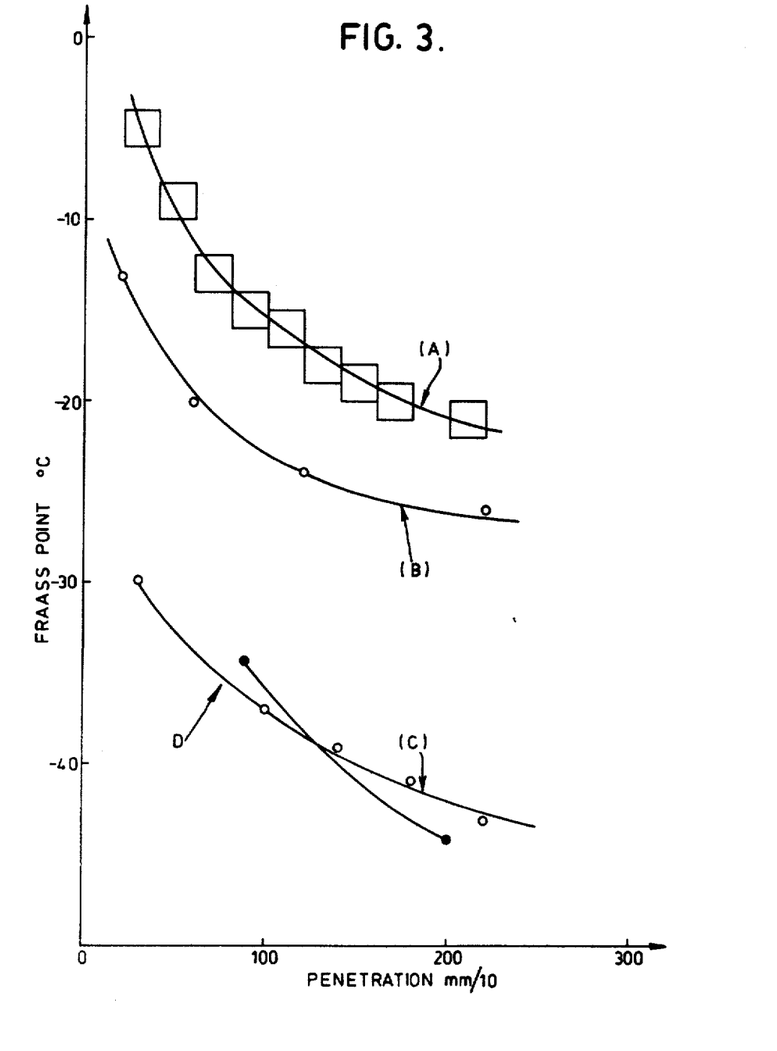
FIG. 3 shows a number of graphs of relationships between the Fraass point and the Penetration for products of the invention and for prior commercially available asphalts.

Reference is now made to FIG. 3, in which curve A shows the usual requirements for prior asphalts obtained from Middle East crude petroleum refining. The boxes on curve A indicate the properties of commercial products which are readily available.

Curves B, C and D shows the brittleness and penetration for three products obtained by the process of the invention. The feedstocks for these curves are phenol extracts of Middle East lubricating oil feedstocks (Extracts I and II) and Tia Juana lubricating oil feedstock (Extract III), the extracts having the following properties:

TABLE I

|  | Extract I, Curve B | Extract II, Curve C | Extract III, Curve D |
| --- | --- | --- | --- |
| Density at 15°C | 0.98–1.01 | 0.96–0.99 | 0.98 |
| Viscosity SSU at 210°F | 115 | 280 | 59 |
| COC °F | 480 | 560 | 392 |
| CCR wt.% | 4.5 | 5 | 4 |
| Pour Point | 110°F | 110°F | −27°C |
| Aniline Point | 130°F | 190°F | 185°F |
| Sulphur wt.% | 2.6 | 0.6 | 3.4 |
| Acid Number | 0.1 | 0.1 | about 4 |
| Aromatics wt.% | 72.2 | 64.1 | 75.0 |
| Distillation °F |  |  |  |
| Initial Boiling Point | 435 | 550 | 670 |
| 20 vol.% | 570 | 640 | 750 |
| 50 vol.% | 610 | 800 | 800 |
| % Vol. distillated at 620°C | 50 | 10.0 | (F.B.P.=850) |

Each extract was blown with 100% $SO_2$ at about 285°C for periods of up to 20 hours. Samples of reacted extract material were taken from time-to-time until asphalt-like materials having a quality comparable with commercial high penetration (HP) asphalts were obtained. The curves of Fraass Point versus penetration show that the characteristics of the products of the invention are greatly superior to those of the commercially available Middle East asphalt (curve A).

Figure 4:
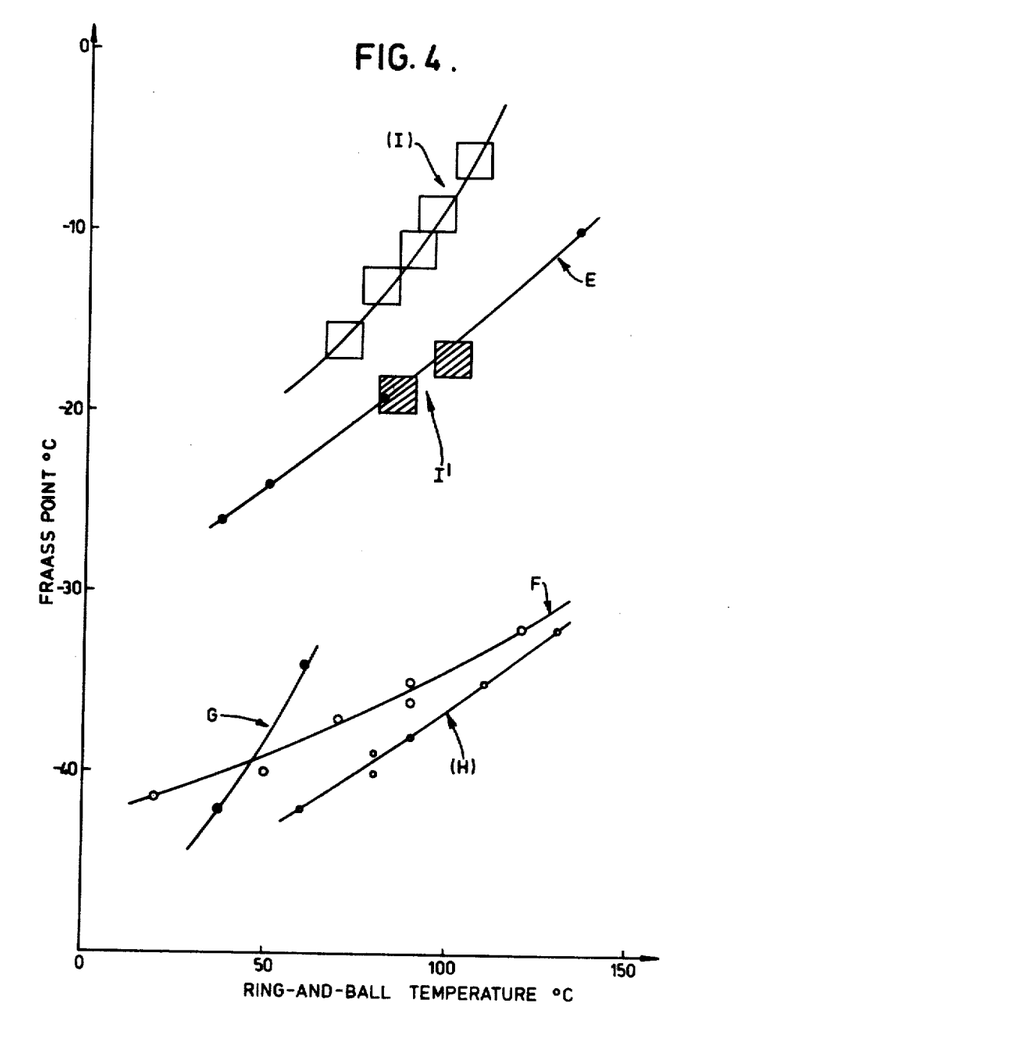
FIG. 4 shows a number of graphs of Fraass point versus ring-and-ball softening point for products of the invention and for prior commercially available air-blow asphalts.

Reference is now made to FIG. 4 in which the brittleness, measured by the Fraass point temperature, is plotted against the ring-and-ball (R+B) softening temperature.

Curves E, F and G represent the characteristics of the products referred to in connection with, respectively, curves B, C and D of FIG. 3 and curve I shows comparable characteristics of commercially available blown asphalts. It is clear that for a given Fraass point, the products of the invention are greatly superior to the commercially available blown asphalt of curve I. The boxes on curve I show the usual areas of acceptability of the commercially-available asphalt. The hatched boxes I' on curve E enclose the acceptable properties for HP grades of presently available conventional asphalts. Curves F and G show properties considerably better than those of commercially-available asphalt products.

Curve H shows the properties of the product obtained by reacting a mixture of 80% extract II and 20% of propane precipitated asphalt (PPA) with $SO_2$ at about 285°C. The properties of this product are remarkably good for each R and B temperature sample, and greatly superior to the commercially available products. The PPA had the following main characteristics:

TABLE 2

| | |
|---|---|
| Density at 15°C | about 1.070 |
| Softening Point °C | 62 |
| Penetration (deci-mms) | 14 |
| Fraass point °C | 5 |
| Viscosity °E at 130°C | about 241 |
| Viscosity °E at 150°C | about 80 |
| Sulphur wt.% | 3.24 |
| Aromatic content wt.% | 74 |
| Molecular wt. (average) | about 1000 |

Figure 5:
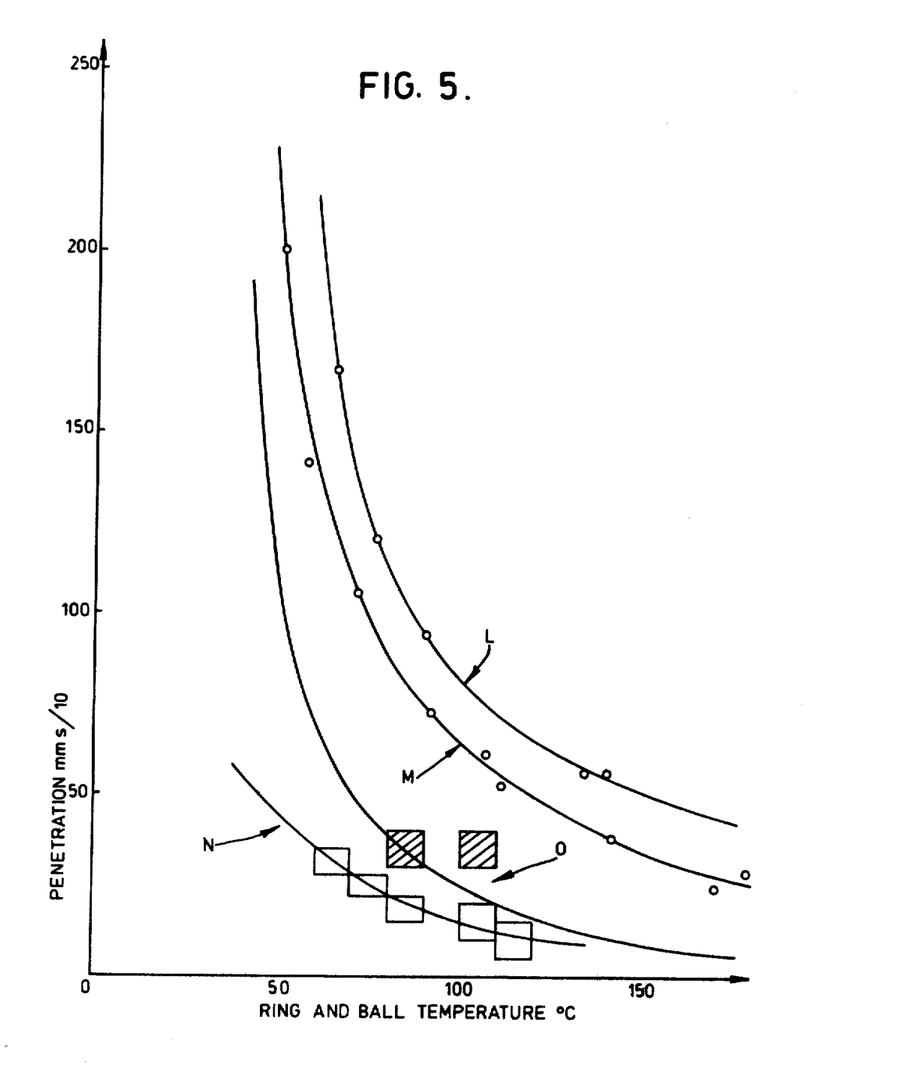
FIG. 5 shows a number of graphs of the Penetration versus Ring-and-ball temperature for products of the invention and prior commercially available asphalts.

Further confirmation of the superiority of the products of this invention relative to commercially-available products is furnished in FIG. 5 in which the reaction product of $SO_2$ with the mixture of 20% PPA + 80% Extract I, referred to in connection with curve H of FIG. 4, is illustrated by curve L, and the product referred to in connection with curve F of FIG. 4 is illustrated by curve M. For any ring-and-ball temperature, these products have greater penetrations than have commercially available conventional blown asphalts (curve N).

Curve O shows the Penetration/R+B properties of $SO_2$-treated Extract I. This product is clearly better than the blown asphalts of curve N and corresponds with the HP grades of conventional asphalts indicated by the hatched squares.

The variation in properties of products of this invention with commercially available blown and HP asphalts is illustrated in the following Examples:

EXAMPLE 1

Extract II was contacted at temperatures of about 275°C (average of the extremes of about 250° and 300°C) with 100% $SO_2$ in the presence of manganese salts of commercially-available naphthenic acids (0.1 wt.%). The $SO_2$ flow rate was maintained at 2 litres/hour/kilogram of extract.

The results are shown comparatively in the following table.

TABLE 3

| $SO_2$ reaction time | Ring and Ball | Penetration Index | |
|---|---|---|---|
| (hours) | Temp.°C | Invention | Commercial Product |
| 10 | 60–70 | 5–6 | 1–2 |
| 12 | 70–80 | 6 | 2–3 |
| 14 | 80–90 | 7–8 | 2–4 |
| 16 | 110–120 | 8 | 4–5 |
| 15 | 95–105 | 7–8 | 6* |
| 14 | 80–90 | 7–8 | 5–6* |
| 20 | 120 | 10 | — |

*High penetration commercial products.

The superior properties of the product of the invention are readily apparent

EXAMPLE 2

This example illustrates the influence of a number of parameters (feedstock, reaction time, $SO_2$ flow rates) on the properties of the product. 100% $SO_2$ was employed. The results of a number of tests are given below in the following table:

TABLE 4

| Feed | Temp. (average) °C | $SO_2$ Flow (litre/hr./kg). | Reaction Time (hrs.) | Penetration dmm. | R+B °C |
|---|---|---|---|---|---|
| Extract I | 285 | 1.5 | 10 | 172 | 45 |
| Extract II | 285 | 2.0 | 13 | 71 | 89 |
| Extract II | 285 | 1.0 | 22 | 154 | 66 |
| Extract II | 285 | 2.5 | 18 | 35 | 160 |
| 20% PPA* + 80%) Extract II ) | 275 | 2.5 | 10 | 57 | 114 |
| 20% PPA* + 80%) Extract II ) | 275 | 1.0 | 15 | 164 | 66 |
| 30% PPA* + 70%) Extract II ) | 275 | 2.5 | 9 | 19 | 150 |
| Extract III | 200 | 1.5 | 8 | 204 | 38 |
| Extract III | 300 | 1.5 | 15 | 80 | 50 |
| Asphalt 180/200** | 275 | 1.0 | 41 | 47 | 52 |

* PPA as previously characterized in Table 2.
** Penetration (dmm) 143–187
R+B °C 44–48
Fraass Point °C −19 to −25
COC °C 280
Aromatics, wt.% 85
Specific Gravity 1.02

From the foregoing results, it appears that an $SO_2$ flow rate of greater than 1 litre/hour/kg of hydrocarbon material for a period of 9 hours or more converts the hydrocarbon material to asphalt-like binding or coating material having a quality better than commercially available conventional asphalt products. Having regard to the average molecular weights of the hydrocarbon materials, it appears that high quality asphalt-like products are obtained when the $SO_2$/hydrocarbon molar ratio is greater than unity, as a rough general rule. The addition of precipitated asphalt to the extract tends to produce lower penetration, higher softening point, products.

EXAMPLE 3

In this example, an 80/100 asphalt from a Middle East crude was treated at 300°C with 100% $SO_2$ at a flow rate of 1 litre/hour/kg.

The reaction temperatures was 300°C. The asphalt before reaction had the following inspections:

Penetration (dmm.)   83–89
Ring and Ball °C     46–49
Fraass Point °C      −12 to −15
COC °C               275
Aromatics, wt.%      84

The test results are given in the following table:

TABLE 5

| Run No. | Reaction Time Hours | Catalyst | Penetration at 25°C (dmm) | Ring and Ball Temp. °C | Fraass Point °C | Ductility at 25°C (cm) |
|---|---|---|---|---|---|---|
| 1 | 5 | No | 47 | 54 | −10 | 100 |
| 2 | 7 | No | 31 | 62 | −7 | 100 |
| 3 | 7 | Yes* | 29 | 61 | −8 | 60 |
| 4 | 8 | Yes** | 14 | 84 | −2 | 15 |

\* Catalyst was manganese salt of commercial naphthenic acids in a concentration of 0.1 wt.%
\*\*Catalyst was 0.1 wt.% Mn-naphthenates, irradiated by UV radiation of wavelength 254 millimicrons before admixture with the asphalt.

It is seen that the four main properties of the asphalt (penetration, softening point, brittleness and ductility) are markedly changed by the process of the reaction. The use of catalyst brings about a greater range of change, as is seen by comparing runs 2 and 3, while irradiating the catalyst hastens the changes still further.

In all cases, the ductility is high having regard to the other properties of the product.

EXAMPLE 5

In this example, extracts I and II were reacted at 280°C with 100% $SO_2$ at a rate of 2 litres/hour/kg in the absence of catalyst for various periods. The results are summarized in the following table:

TABLE 6

| Run No. | Feed Extract | Time Hours | Pen. at 25°C (dmm) | R+B °C | Fraass Point °C | Ductility at 25°C (cm) |
|---|---|---|---|---|---|---|
| 1 | I | 10 | 172 | 43 | −25 | 100 |
| 2 | I | 12 | 109 | 48 | −24 | 100 |
| 3 | I | 14 | 29 | 61 | −8 | 60 |
| 4 | I | 14 | 31 | 62 | −7 | 100 |
| 5 | 50% I + 50% II | 13 | 47 | 54 | −10 | 100 |
| 6 | 50% I + 50% II | 16 | 14 | 84 | −1 | 15 |

Clearly, a great variety of combinations of properties can be obtained by appropriate selection of the feed hydrocarbon material, the rate of $SO_2$ treating and the overall processing time.

The working of the invention may also be achieved with suitable catalyst, preferably of low cost, and by using dilute $SO_2$-containing gas streams.

EXAMPLE 6

80 wt.% aromatic extract I and 20 wt.% PPA as in Table 2 formed the feed material. 100% $SO_2$ was blown through the mixture at 300°C for different times, using different catalysts which had previously been mixed in the asphalt in finely powdered form. The $SO_2$ rate was 1.5 litres/hr./kg. Results are summarized in Table 7.

TABLE 7

| Run No. | Duration Hours | Catalyst | Concentration wt.% | Pen. at 25°C (dmm) | R+B °C | Fraass Point |
|---|---|---|---|---|---|---|
| 1 | 12 | $KMnO_4$ | 0.15 | 110 | 55 | −22 |
| 2 | 9 | $FeCl_3$ | 0.1 | 105 | 55 | −25 |
| 3 | 6 | Mn Naphthenate | 0.1 | 110 | 51 | −26 |

It will be seen that although longer reaction times were required, the cheaper catalyst of runs 1 and 2 produced products of similar properties to that of run 3.

EXAMPLE 7

This example illustrates the practice of the invention employing diluted $SO_2$. The feed hydrocarbon material was as in Example 6, the catalyst being 0.1 wt.% manganese naphthenate. The gas flow rate was about 2.5 litres/hour/kilogram. The results are reported in Table 8.

TABLE 8

| Run No. | Gas Composition $SO_2$ | Air | $N_2$ | Duration Hours | Pen. at 25°C dmm. | R+B °C | Fraass °C |
|---|---|---|---|---|---|---|---|
| 1 | 15 | — | 85 | 12 | 105 | 54 | −21 |
| 2 | 15 | 25 | 60 | 10 | 80 | 60 | −21 |
| 3 | 50 | 50 | — | 9 | 99 | 53 | −25 |
| 4 | 100 | — | — | 8 | 110 | 51 | −26 |

Thus even when the $SO_2$ is diluted with oxygen-containing diluents, such as air, it is still possible to employ the $SO_2$ to produce good quality asphalt products from refinery products of low utility, and thereby avoid air pollution with $SO_2$ and avoid the creation of problems of disposing of the low utility refinery products.

Other low utility refinery products may also be employed in the process of the invention to make binders for roads and pavings and for coating roofs. Among these materials are heavy vacuum pipe still (VPS) streams, vacuum bottoms, and deasphalted oil. Typical properties of these are:

|  | Heavy VPS stream | Vacuum Bottom (Middle East Crude) | Deasphalted Oil |
|---|---|---|---|
| Viscosity at 210°F SSU | 76.0 | — | 184 |
| Sulphur wt.% | 2.33 | 4.1 | — |
| COC °C | 296 | 324 | 300 |
| Aromatic % wt. | 53 | 78 | 59 |
| Penetration | — | 7400 | — |

The foregoing properties are examplary only of the general range of properties which will be well-known to those skilled in the art.

What is claimed is:

1. A process for the production of a binding and coating agent which comprises contacting, in the liquid phase, an aromatic extract of a lubricating oil distillate fraction with a gas containing from 5 to 100 wt. % of sulphur dioxide, said contacting being conducted at approximately atmospheric pressure, and a temperature within the range of 180° to 650°C., at a ratio of feed of $SO_2$ per hour of from 0.5 to 10 liters (at S.T.P.) per kilogram of said aromatic extract, said contacting being sufficient to increase the sulphur content of the aromatic extract by from 0.75 to 12 percent by weight.

2. A process as defined by claim 1 wherein said aromatic extract has an aromatic content of at least 55 wt. %, a viscosity at 210°F. of from 30 to 300 SSU, and an initial boiling point in the range from 350° to 670°F.

3. A process as defined by claim 1 wherein said aromatic extract is in admixture with solvent precipitated asphalt having a penetration of from 1 to 35 mm/10 and a softening point of from 50° to 85°C., the aromatic extract constituting more than 55% of the mixture.

4. A process as defined by claim 1 wherein there is present, in the liquid being contacted, a catalyst selected from the group consisting of organic salts of transition metals, inorganic salts of Fe, Mn, Cr, B; and Ni in their high valence states, and mixtures thereof, in a concentration of from 0.1 to 1 wt. % of metal based on the weight of material being contacted.

5. A process as defined by claim 4 wherein said catalyst comprises manganese salts of petroleum naphthenic acids.

6. A process as defined by claim 1 wherein the aromatic extract has an aromatics content of from 60 to 87 wt. %.

7. A process as defined by claim 1 wherein the contacting temperature is in the range of 200° to 370°C.

8. A product made by the process of claim 1 having a penetration of at least 7 mm/10, a softening temperature of at least 25°C., and a ductility not exceeding 250.

* * * * *